US012523627B2

(12) United States Patent
Alarwi et al.

(10) Patent No.: US 12,523,627 B2
(45) Date of Patent: Jan. 13, 2026

(54) DETECTING DAMAGE TO A BLADDER IN AN OIL RESERVOIR OF A POWER TRANSFORMER

(71) Applicant: Saudi Arabian Oil Company, Dhahran (SA)

(72) Inventors: Nawaf Hamid Alarwi, Al Khobar (SA); Maher Hamed Alerwi, Dhahran (SA); Layan AlSharif, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 176 days.

(21) Appl. No.: 18/435,048

(22) Filed: Feb. 7, 2024

(65) Prior Publication Data

US 2025/0251357 A1    Aug. 7, 2025

(51) Int. Cl.
*G01N 27/04* (2006.01)
*H01F 27/12* (2006.01)
*H01F 27/28* (2006.01)

(52) U.S. Cl.
CPC .......... *G01N 27/041* (2013.01); *H01F 27/12* (2013.01); *H01F 27/2823* (2013.01)

(58) Field of Classification Search
CPC ...... G01N 27/04; G01N 27/041; H01F 27/12; H01F 27/28; H01F 27/14; H01F 27/2823; H01F 27/402
See application file for complete search history.

(56) References Cited

U.S. PATENT DOCUMENTS

| 8,099,023 | B2 | 1/2012 | Law |
| 8,964,186 | B2* | 2/2015 | Cheim ................ H01F 27/402 |
| | | | 356/448 |
| 9,377,341 | B1 | 6/2016 | Watson |
| 2013/0006357 | A1 | 1/2013 | Cheim |
| 2014/0305201 | A1* | 10/2014 | Watson ................ G01F 23/18 |
| | | | 73/290 R |
| 2017/0074726 | A1 | 3/2017 | McCreight, Jr. et al. |

FOREIGN PATENT DOCUMENTS

| CN | 209418258 U | * | 9/2019 | ............ H01F 27/14 |
| CN | 111105926 B | | 4/2022 | |
| CN | 219495371 | | 8/2023 | |

(Continued)

OTHER PUBLICATIONS

English translation CN 209418258 U (Year: 2019).*

(Continued)

*Primary Examiner* — Eman A Alkafawi
*Assistant Examiner* — Courtney G Mcdonnough
(74) *Attorney, Agent, or Firm* — Fish & Richardson P.C.

(57) ABSTRACT

Systems and methods for detecting damage to a bladder for controlling fluid levels in an oil reservoir of a power transformer include a bladder sleeve. The bladder sleeve includes an inner elastomer layer defining an interior of the bladder sleeve; an outer elastomer layer limiting flow of liquids into the interior of the bladder sleeve; and a middle layer disposed between the inner elastomer layer and the outer elastomer layer, the middle layer including carbon nanotube windings having electrodes attached to opposite ends of the carbon nanotube windings, the carbon nanotube windings having a resistance that changes in response to damage to the bladder.

20 Claims, 4 Drawing Sheets

(56) References Cited

FOREIGN PATENT DOCUMENTS

| IN | 350233 | 1/2019 |
|---|---|---|
| KR | 101090143 B1 | 12/2011 |
| WO | WO 2011079357 | 7/2011 |

OTHER PUBLICATIONS

Bazbouz et al., "Novel mechanism for spinning continuous twisted composite nanofiber yarns," European Polymer Journal, 2008, 44(1):1-12, 12 pages.
insulect.com [online], "Transformer Material Compatibility," retrieved from URL <https://insulect.com/transformer-oil-material-compatibility>, retrieved on Oct. 1, 2024, 9 pages.
Koziol et al., "High-performance carbon nanotube fiber," Science, 2007, 318(5858):1892-1895, 5 pages.
Ma et al., "Dispersion and functionalization of carbon nanotubes for polymer-based nanocomposites: A review," Composites Part A: Applied Science and Manufacturing, Jul. 2010, 41(10):1345-1367, 23 pages.
Nadler et al., "Preparation of colloidal carbon nanotube dispersions and their characterisation using a disc centrifuge," Carbon, 2008, 46(11):1384-1392, 9 pages.
Shokrieh et al., "Mechanical properties of multi-walled carbon nanotube/polyester nanocomposites," Journal of Nanostructure in Chemistry, 2013, 3(20)1-5, 5 pages.
International Search Report and Written Opinion in International Appln. No. PCT/US2025/014476, mailed Jun. 2, 2025, 14 pages.

\* cited by examiner

DETECTING DAMAGE TO A BLADDER IN AN OIL RESERVOIR OF A POWER TRANSFORMER

TECHNICAL FIELD

This disclosure generally relates to a bladder in an oil reservoir of a power transformer.

BACKGROUND

Power transformers are used to step up or step down voltages in electrical power systems. Power transformers include dielectric oil that can function as an insulator against electrical surges, aid heat dissipation from the power transformer, and provide a medium for electric arc quenching. The temperature of the power transformer can fluctuate during operation of the power transformer leading to expansion or contraction of the dielectric oil.

SUMMARY

A bladder, or air cell, can be used in an oil reservoir of a power transformer to compensate for temperature-induced volume changes of the dielectric oil. The bladder enables a consistent oil level in the power transformer aiding efficient operation and longevity of the power transformer. The bladder also maintains a sealed environment within the oil reservoir reducing contamination (e.g., from moisture, air, solid particles) of the dielectric oil that could degrade the oil's insulating properties, which can affect the power transformer's overall performance.

This disclosure describes systems and methods for detecting damage to a bladder in an oil reservoir of a power transformer. The bladder can include a bladder sleeve having electrically conductive materials within the bladder sleeve walls. Damage to the bladder (e.g., tears or ruptures in the bladder wall) can allow oil from the oil reservoir to penetrate into the interior of the bladder. As the oil comes into contact with the electrically conductive material as it passes through the bladder sleeve wall, the oil can disrupt the flow of electricity through the electrically conductive material (e.g., increase resistance). Damage to the bladder can be detected when an increased resistance of the electrically conductive material is measured. The bladder sleeve can include an inner elastomer layer defining an interior of the bladder sleeve, an outer elastomer layer limiting flow of liquids into the interior of the bladder sleeve, and a middle layer between the inner elastomer layer and the outer elastomer layer. The middle layer can include carbon nanotube windings having electrodes attached to opposite ends of the carbon nanotube windings. The resistance of the carbon nanotube windings can change in response to damage to the bladder.

Implementations of the systems and methods of this disclosure can provide various technical benefits. Small fluid leaks resulting from damage to the bladder can be detected earlier than with methods that use channels to collect leaked oil. For example, damage to the outer elastomer layer of the bladder sleeve on the order of the spacing between adjacent windings of the carbon nanotube windings can be detected before ingress of dielectric oil into the interior of the bladder. Damage can be detected before loss of oil and/or contamination of the oil has occurred. The state of the bladder can be continuously monitored in real-time by continuously measuring the resistance of the carbon nanotube windings. The state of the bladder can be remotely monitored by transmitting the measured resistance to a remote computing system over a wired or wireless network. The bladder sleeve can be used to retrofit bladders already in operation without having to replace the bladder.

The details of one or more implementations of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods for detecting damage to a bladder in an oil reservoir of a power transformer. A bladder sleeve disposed around the bladder can include an inner elastomer layer defining an interior of the bladder sleeve, an outer elastomer layer limiting flow of liquids into the interior of the bladder sleeve, and a middle layer between the inner elastomer layer and the outer elastomer layer. The middle layer can include carbon nanotube windings having electrodes attached to opposite ends of the carbon nanotube windings. The resistance of the carbon nanotube windings can change in response to damage to the bladder.

Figure 1:
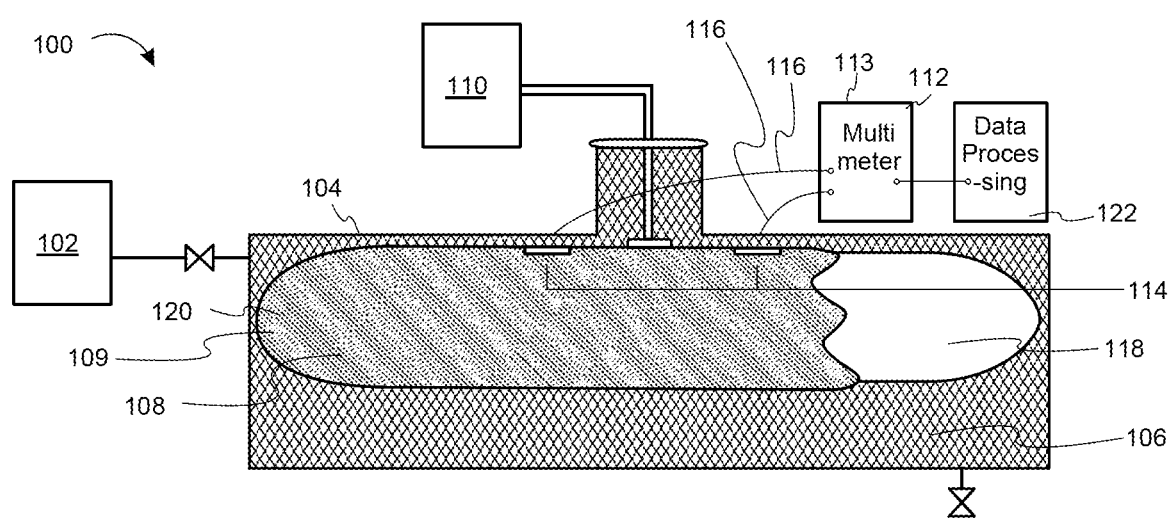
FIG. 1 is a schematic of a power transformer system including an oil reservoir including a bladder sleeve with carbon nanotube windings.

FIG. 1 is a schematic of an example system 100 including a power transformer 102 and an oil reservoir 104 fluidly coupled to the power transformer 102. The oil reservoir 104 holds a supply of a dielectric oil 106. The dielectric oil 106 can flow between the oil reservoir 104 and the power transformer 102. During operation, the temperature of the power transformer 102 can fluctuate causing the temperature of the dielectric oil 106 to fluctuate and the volume of the dielectric oil to expand or contract. The oil reservoir 104 provides additional volume to allow the dielectric oil 106 to expand or contract and maintain a consistent level of dielectric oil 106 in the power transformer 102. To enable the change in volume while reducing exposure of the dielectric oil 106 to contamination from, e.g., air, moisture, solid particles, a bladder 108 is positioned within the oil reservoir 106.

The bladder 108 is made from a flexible material and can be inflated or deflated to occupy volume in the oil reservoir 104 that is not occupied by the dielectric oil 106. For example, if the dielectric oil 106 contracts, the bladder 108 can be inflated or expanded to occupy the volume occupied by the dielectric oil 106 prior to contraction. If the dielectric oil 106 expands, the bladder 108 can be deflated or contracted to allow the dielectric oil 106 to expand into the volume previously occupied by the bladder 108. The bladder can be made from elastomers compatible with the dielectric oil such as silicone, ethylene propylene diene monomer (EPDM), and fluoroelastomer (e.g., Viton™).

The interior of the bladder 108 is in fluid communication with a transformer breather 110. The transformer breather facilitates air flow into and out of the bladder 108. The transformer breather 110 can include a desiccant and/or other material to remove moisture and contaminants from the air.

A bladder sleeve 109 is disposed around the bladder 108. The bladder sleeve 109 includes sensors to detect damage to the bladder 108. The bladder sleeve 109 expands and contracts with the bladder 108. A resistivity sensor 112 is electrically coupled to electrodes 114 by insulated wire leads 116 of the bladder sleeve 109. The electrodes 114 are attached to opposite ends of carbon nanotube windings in the bladder sleeve 109. The insulated wire leads 116 are designed to be compatible with the environment of the system 100 (e.g., compatible with the dielectric oil 106 and temperatures of the oil reservoir). The resistivity sensor 112 is housed in a housing 113 including a non-conductive polymer material. The housing 113 shields the resistivity sensor 112 from electrical interference and short circuits. The housing is located near the power transformer 102. The housing is isolated from areas with high temperatures (e.g., temperatures exceeding a glass transition temperature of the polymer material or temperatures exceeding a maximum operating temperature of the resistivity sensor 112).

The resistivity sensor 112 measures the resistance of the carbon nanotube windings disposed between an inner elastomer layer 118 and an outer elastomer layer 120 of the bladder sleeve 109. The resistivity sensor 112 transmits the measured resistance to a data processing system 122 over a wired or wireless communications link. When the bladder sleeve 109 is damaged, the resistivity of the carbon nanotube windings increases. Damage is detected when the resistivity exceeds a threshold resistivity. The threshold resistivity can be determined to identify changes in the resistance that exceed resistance changes from inflation and deflation of the bladder 108 during normal operation of the system 100.

In response to measuring a resistivity that exceeds the threshold resistivity, the data processing system can generate an alert indicating that the damage has been detected. For example, the data processing system can generate an audible alert (e.g., an alarm) or a visual alert (e.g., flashing lights, pop-up alert on a display device, text based alert). In some implementations, the data processing system 122 stops operation of the power transformer 102 until the bladder 108 is replaced by an operator.

The resistivity sensor 112 can transmit the resistivity data continuously (e.g., without interruption or at specified time intervals on a repeating basis) and/or in real-time. Real-time or near real-time processing and/or communication refers to a scenario in which received data (e.g., resistance measurements) are processed as made available to systems and devices requesting those data immediately (e.g., within milliseconds, tens of milliseconds, or hundreds of milliseconds) after the processing of those data are completed, without introducing data persistence or store-then-forward actions. In this context, a real-time communication system is configured to process measured resistance data as it arrives and transmits the resistance data as quickly as possible (though processing latency may occur). Though data can be buffered between module interfaces in a pipelined architecture, each individual module operates on the most recent data available to it. The overall result is a workflow that, in a real-time context, receives a data stream (e.g., a resistance measurement) and outputs (e.g., transmits) processed data based on that data stream in a first-in, first out manner. However, non-real-time contexts are also possible, in which data are stored (either in memory or persistently) for processing at a later time. In this context, modules of the data processing system do not necessarily operate on the most recent data available. In some implementations the resistivity sensor 112 transmits the measured resistivity to a remote data processing system over a wireless network connection (e.g., Wi-Fi, cellular, etc.) enabling remote monitoring of the bladder 108.

Figure 2:
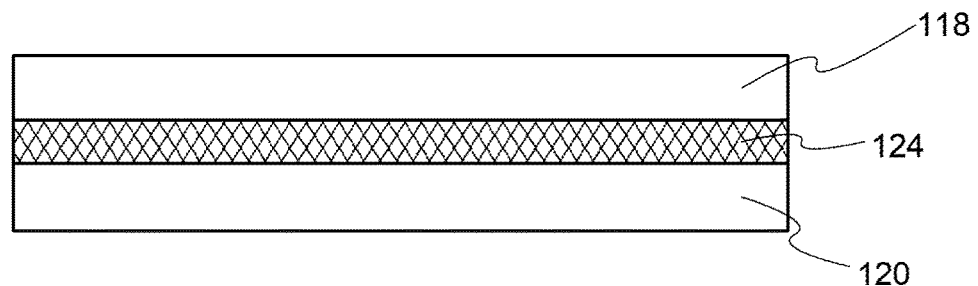
FIG. 2 is a cross-sectional view of a portion of the bladder sleeve of FIG. 1.

FIG. 2 is a cross-sectional view of the layers of the bladder sleeve 109. The bladder sleeve 109 includes the inner elastomer layer 118, the outer elastomer layer 120, and a middle layer including carbon nanotube windings 124 disposed between the inner elastomer layer 118 and the outer elastomer layer 120. The carbon nanotube windings 124 can be 2.5% to 30% by weight of the bladder 108.

Figure 3:
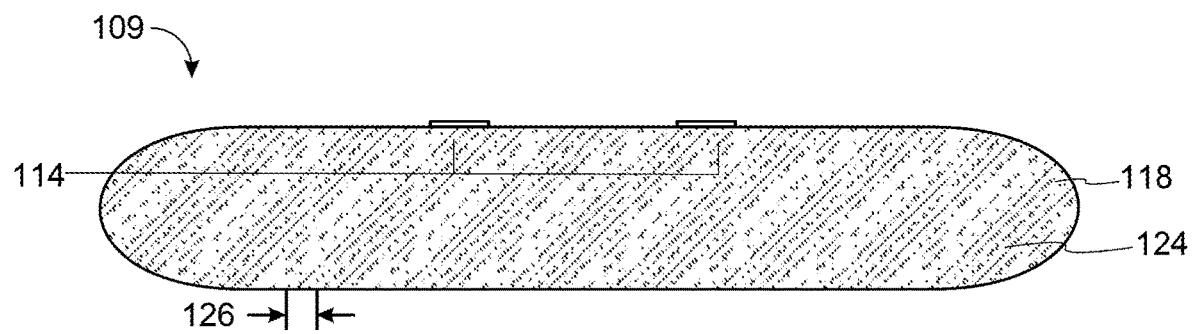
FIG. 3 is an illustration of carbon nanotube windings on the bladder sleeve of FIG. 1.

FIG. 3 is a view of the bladder sleeve 109 showing carbon nanotube windings 124 without the outer elastomer layer 120. The carbon nanotube windings 124 are spaced apart with a gap 126 between adjacent windings. The gap 126 can be determined based on an expected damage size of the outer elastomer layer 120. For example, the gap 126 can be less than a typical damage size of the bladder 108 such that small areas of damage to the bladder sleeve 109 will result in increased resistance of the carbon nanotube windings. In some implementations, the gap 126 is between 1 millimeter (mm) and 10 mm.

Electrodes 114 are made from conductive materials. For example, the electrodes 114 can be made from metallic pastes such as silver or gold. The electrodes 114 are attached to opposite ends of the carbon nanotube windings 124. A resistivity measurement between the electrodes 114 measures the resistance of the carbon nanotube windings 124.

The carbon nanotube windings 124 form a continuous rope spiraled between the inner elastomer layer 118 and the outer elastomer layer 120. The carbon nanotube windings 124 can include Single-Walled Carbon Nanotubes (SWCNTs) and/or Multi-Walled Carbon Nanotubes (MWCNTs). MWCNTs can have better electrical conductivity as compared with SWCNTs.

In some implementations, the carbon nanotube windings 124 include multiple sections. For example, two or more sections of carbon nanotube windings can be wound around the inner elastomer layer 118. Each section of the carbon nanotube windings can have electrodes attached at each end. A resistance measurement can be taken from each section individually. In some implementations, the multiple sections are connected in series, and a total resistance measurement is taken across all of the sections.

The carbon nanotube rope includes a forest of carbon nano-tubes packed tightly into cable-like bundles to maintain a continuous electrical pathway from one end of the carbon nanotube rope to the opposite end. Methods such as ultrasonication, mechanical mixing, and the use of surfactants can be used to evenly mix the carbon nanotubes in a matrix material (e.g., silicone, EPDM, or fluoroelastomer). The rope structure of the carbon nanotube windings 124 can be formed using techniques such as electrospinning, twisting and spinning, and dense packing.

Electrospinning uses an electric field to draw charged threads of carbon nanotubes into bundles. Electrospinning can be suitable for producing fibers with nanoscale diameters, offering control over fiber alignment and bundle density.

Twisting and spinning is a method that mimics traditional yarn manufacturing processes. Twisting and spinning involves intertwining individual carbon nanotubes to form yarn-like structures to produce fibers that exploit the properties of carbon nanotubes (e.g., strength and electrical conductivity) at a macroscopic scale.

Dense packing uses centrifugation or controlled sedimentation techniques to pack carbon nanotubes to a desired compactness within the cable-like bundles. Dense packing can generate carbon nanotube ropes having improved alignment and density of carbon nanotubes within a given structure as compared with other techniques.

In some implementations, the bladder sleeve 109 can be used to overlay an existing bladder in an oil reservoir of a power transformer to provide real time monitoring capabilities to the existing air bladder. For example, the bladder sleeve 109 can be stretched to fit around the existing bladder. The flexible materials used to form the bladder sleeve 109 enable the bladder sleeve to stretch around the bladder without compromising the carbon nanotube windings 124. The bladder sleeve 109 conforms to the geometry and structure of the bladder to integrate the bladder sleeve 109 and the bladder and reduce interference between the two.

Figure 4:
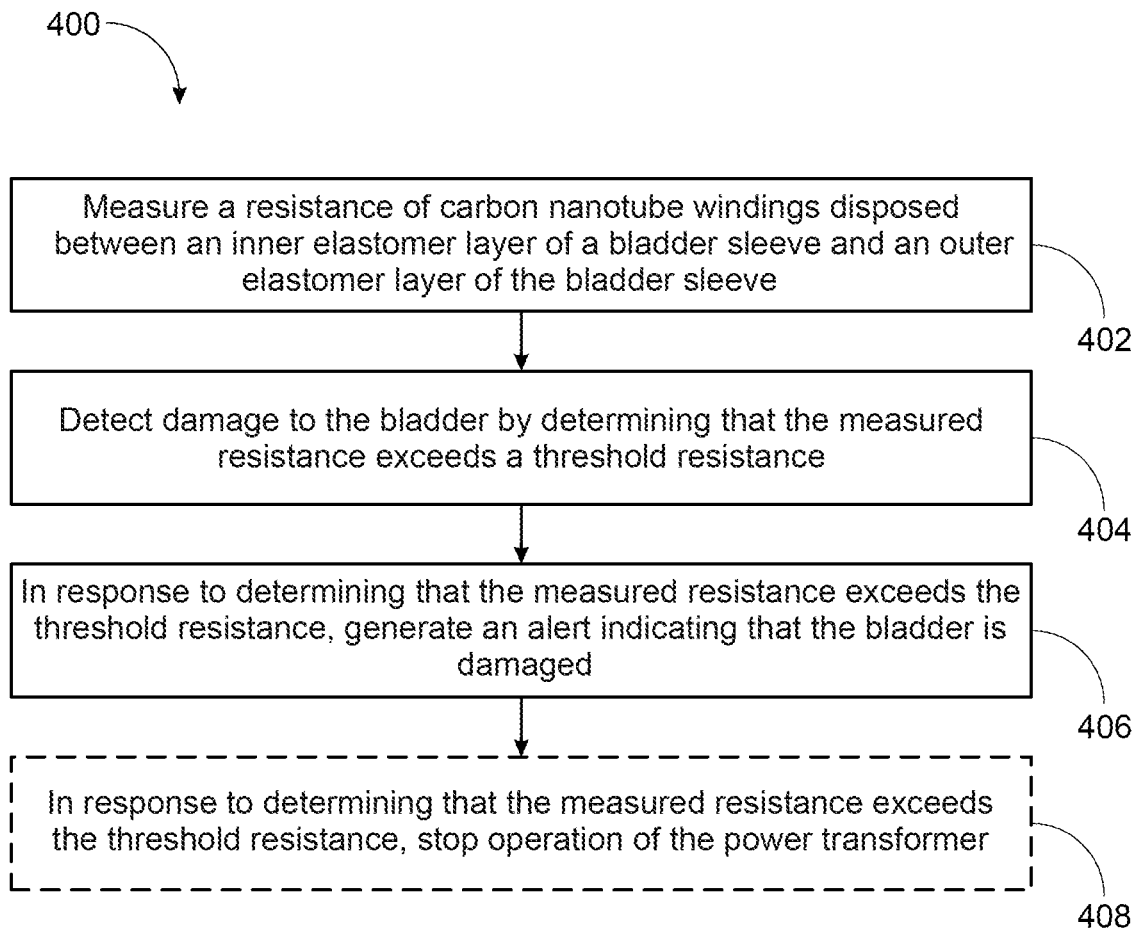
FIG. 4 is a flow chart of a method for detecting damage to a bladder in an oil reservoir of a power transformer.

FIG. 4 is a flow chart for an example method 400 to detect damage to a bladder disposed in an oil reservoir of a power transformer. The method 400 can be implemented, for example, on a data processing system (e.g., data processing system 122).

The data processing system measures a resistance of carbon nanotube windings disposed between an inner elastomer layer of a bladder sleeve disposed around the bladder and an outer elastomer layer of the bladder sleeve (step 402). The data processing system can obtain the resistance measurement from a resistivity sensor coupled to electrodes attached to opposite ends of the carbon nanotube windings.

The data processing system detects damage to the bladder by determining that the measured resistance exceeds a threshold resistance (step 404). The threshold resistance can be set at a value that is greater than a resistance change expected during inflation and deflation of the bladder in normal operation of the power transformer. In some implementations, the data processing system determines the threshold resistance based on a time-series analysis of resistance measurements. Abrupt changes in resistance of the carbon nanotube windings can also indicate that the bladder has been damaged.

In response to determining that the measured resistance exceeds the threshold resistance, the data processing system generates an alert indicating that the bladder is damaged (step 406). For example, the data processing system generates an audible alert (e.g., an alarm) and/or a visual alert (e.g., a flashing indicator, a text-based notification, etc.).

In some implementations, the data processing system stops operation of the power transformer in response to determining that the measured resistance exceeds the threshold resistance (step 408). Stopping operation of the power transformer can prevent damage to the power transformer that can result from contaminated and/or inadequate supplies of dielectric oil resulting from a damaged bladder.

The data processing system can transmit the measured resistance to a remote computing system over a network connection (e.g., a wired or wireless network connection) to remotely monitor the bladder. For example, the data processing system can transmit the measured resistance over a cellular or Wi-Fi network to a remote computing system at a location where multiple power transformers are monitored by operating personnel.

Figure 5:
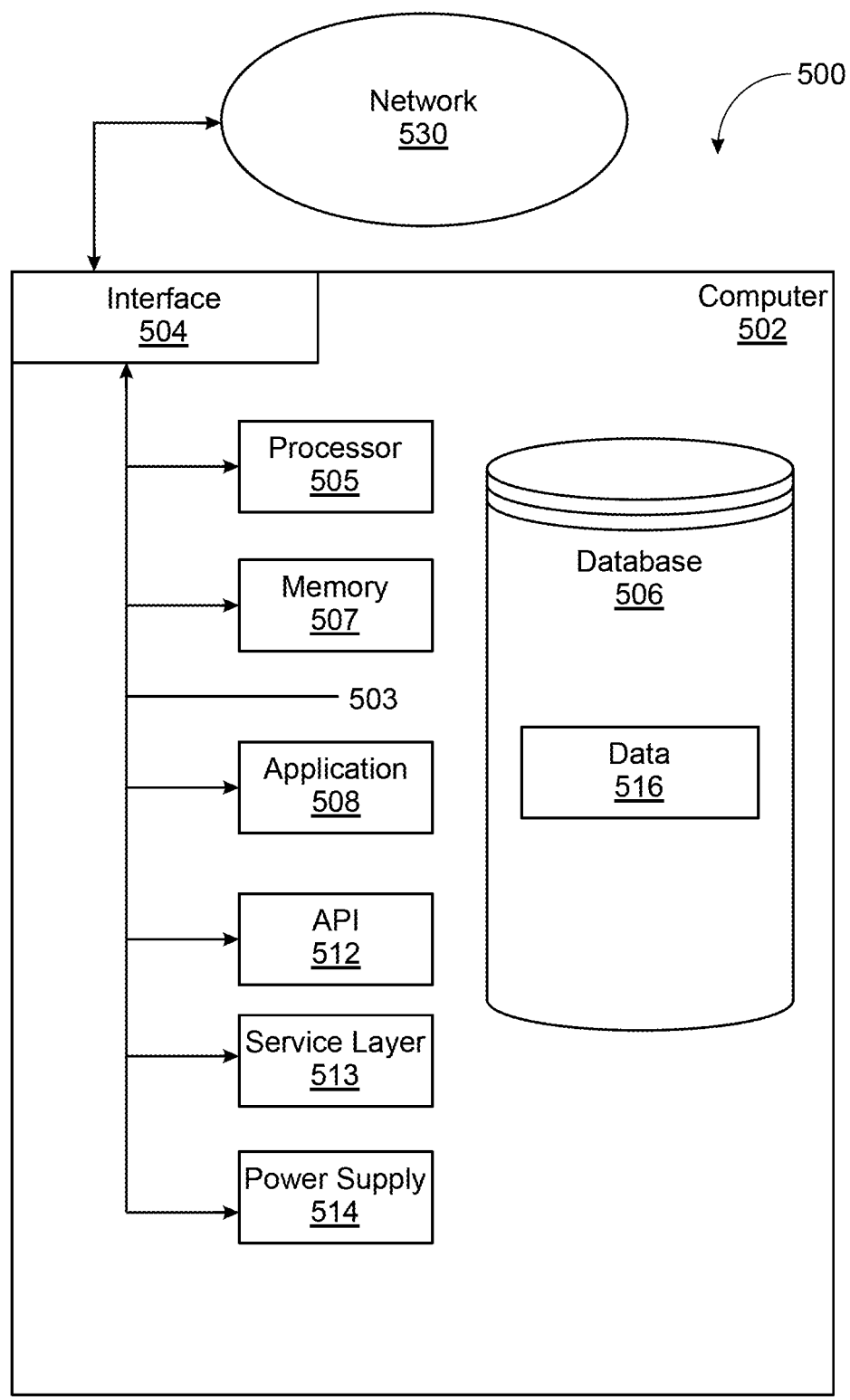
FIG. 5 is a block diagram illustrating an example computer system used to provide computational functionalities associated with described algorithms, methods, functions, processes, flows, and procedures according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can hold data 516 (e.g., resistivity data). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of these systems and methods have been described. Nevertheless, it will be understood that various modifications may be made without departing from the spirit and scope of this disclosure. Accordingly, other implementations are within the scope of the following claims.

Examples

In an example implementation, a power transformer includes an oil reservoir; a bladder disposed in the oil reservoir for controlling fluid levels in the oil reservoir; a bladder sleeve disposed around the bladder, the bladder sleeve including: an inner elastomer layer defining an interior of the bladder sleeve; an outer elastomer layer limiting flow of liquids into the interior of the bladder sleeve; a middle layer disposed between the inner elastomer layer and the outer elastomer layer, the middle layer including carbon nanotube windings having electrodes attached to opposite ends of the carbon nanotube windings, the carbon nanotube windings having a resistance that changes in response to damage to the bladder sleeve; and a transformer breather in fluid communication with the interior of the bladder.

An aspect combinable with the example implementation includes a resistivity sensor electrically coupled to the electrodes.

Another aspect combinable with any of the previous aspects includes at least one processor and a memory storing instructions that when executed by the at least one processor cause the at least one processor to perform operations including measuring a resistance of the carbon nanotube windings using the resistivity sensor; determining that the measured resistance exceeds a threshold resistance; and in response to determining that the measured resistance exceeds the threshold resistance, generating an alert indicating that the resistance exceeds the threshold resistance.

In another aspect combinable with any of the previous aspects, the operations include transmitting the measured resistance from the sensor to an external computing device over a network connection.

In another aspect combinable with any of the previous aspects, the carbon nanotube windings include a single continuous rope of carbon nanotubes wound around the inner elastomer layer.

In another aspect combinable with any of the previous aspects, the carbon nanotube windings are spaced with a gap between adjacent windings in the range of 1 millimeter to 10 millimeters.

In another aspect combinable with any of the previous aspects, the carbon nanotube windings include multi-walled carbon nanotubes.

In another aspect combinable with any of the previous aspects, the inner elastomer layer and the outer elastomer layer comprise silicone, ethylene propylene diene monomer, or a fluoroelastomer.

In another aspect combinable with any of the previous aspects, the carbon nanotube windings comprise 2.5% to 30% of the bladder by weight.

In another example implementation, a bladder sleeve for detecting damage to a bladder for controlling fluid levels in an oil reservoir of a power transformer includes an inner elastomer layer defining an interior of the bladder sleeve; an outer elastomer layer limiting flow of liquids into the interior of the bladder sleeve; and a middle layer disposed between the inner elastomer layer and the outer elastomer layer, the middle layer including carbon nanotube windings having electrodes attached to opposite ends of the carbon nanotube windings, the carbon nanotube windings having a resistance that changes in response to damage to the bladder.

In an aspect combinable with the example implementation, the carbon nanotube windings includes a single continuous rope of carbon nanotubes wound around the inner elastomer layer.

In another aspect combinable with any of the previous aspects, the carbon nanotube windings are spaced with a gap between adjacent windings in the range of 1 millimeter to 10 millimeters.

In another aspect combinable with any of the previous aspects, the carbon nanotube windings include multi-walled carbon nanotubes.

In another aspect combinable with any of the previous aspects, the inner elastomer layer and the outer elastomer layer comprise silicone, ethylene propylene diene monomer, or a fluoroelastomer.

In another aspect combinable with any of the previous aspects, the carbon nanotube windings include 2.5% to 30% of the bladder by weight.

In another aspect combinable with any of the previous aspects, insulated wire leads attached to each electrode, the insulated wire leads configured to be connected to a resistivity sensor.

In another example implementation, a method for detecting damage to a bladder disposed in an oil reservoir of a power transformer includes measuring a resistance of carbon nanotube windings disposed between an inner elastomer layer of a bladder sleeve disposed around the bladder and an outer elastomer layer of the bladder sleeve; detecting damage to the bladder by determining that the measured resistance exceeds a threshold resistance; and in response to determining that the measured resistance exceeds the threshold resistance, generating an alert indicating that the bladder is damaged.

An aspect combinable with the example implementation includes in response to determining that the measured resistance exceeds the threshold resistance, stopping operation of the power transformer.

In another aspect combinable with any of the previous aspects, transmitting the measured resistance to a remote computing system over a network connection to remotely monitor the bladder.

In another aspect combinable with any of the previous aspects, the carbon nanotube windings include a single continuous rope of carbon nanotubes wound around the inner elastomer layer of the bladder sleeve with electrodes attached to opposite ends of the single continuous rope of carbon nanotubes; and where measuring the resistance of the carbon nanotube windings includes measuring the resistance using a resistivity sensor electrically coupled to the electrodes.

What is claimed is:

1. A power transformer comprising:
    an oil reservoir;
    a bladder disposed in the oil reservoir for controlling fluid levels in the oil reservoir;
    a bladder sleeve disposed around the bladder, the bladder sleeve comprising:
        an inner elastomer layer defining an interior of the bladder sleeve;
        an outer elastomer layer limiting flow of liquids into the interior of the bladder sleeve;
        a middle layer disposed between the inner elastomer layer and the outer elastomer layer, the middle layer including carbon nanotube windings having electrodes attached to opposite ends of the carbon nanotube windings, the carbon nanotube windings having a resistance that changes in response to damage to the bladder sleeve; and
    a transformer breather in fluid communication with the interior of the bladder.

2. The power transformer of claim 1, further comprising:
    a resistivity sensor electrically coupled to the electrodes.

3. The power transformer of claim 2, further comprising:
    at least one processor and a memory storing instructions that when executed by the at least one processor cause the at least one processor to perform operations comprising:
    measuring a resistance of the carbon nanotube windings using the resistivity sensor;
    determining that the measured resistance exceeds a threshold resistance; and
    in response to determining that the measured resistance exceeds the threshold resistance, generating an alert indicating that the resistance exceeds the threshold resistance.

4. The power transformer of claim 3, wherein the operations further comprise:
    transmitting the measured resistance from the sensor to an external computing device over a network connection.

5. The power transformer of claim 1, wherein the carbon nanotube windings comprise a single continuous rope of carbon nanotubes wound around the inner elastomer layer.

6. The power transformer of claim 5, wherein the carbon nanotube windings are spaced with a gap between adjacent windings in the range of 1 millimeter to 10 millimeters.

7. The power transformer of claim 1, wherein the carbon nanotube windings comprise multi-walled carbon nanotubes.

8. The power transformer of claim 1, wherein the inner elastomer layer and the outer elastomer layer comprise silicone, ethylene propylene diene monomer, or a fluoroelastomer.

9. The power transformer of claim 1, wherein the carbon nanotube windings comprise 2.5% to 30% of the bladder by weight.

10. A bladder sleeve for detecting damage to a bladder for controlling fluid levels in an oil reservoir of a power transformer, the bladder sleeve comprising:

an inner elastomer layer defining an interior of the bladder sleeve;

an outer elastomer layer limiting flow of liquids into the interior of the bladder sleeve; and a middle layer disposed between the inner elastomer layer and the outer elastomer layer, the middle layer including carbon nanotube windings having electrodes attached to opposite ends of the carbon nanotube windings, the carbon nanotube windings having a resistance that changes in response to damage to the bladder.

11. The bladder sleeve of claim 10, wherein the carbon nanotube windings comprise a single continuous rope of carbon nanotubes wound around the inner elastomer layer.

12. The bladder sleeve of claim 11, wherein the carbon nanotube windings are spaced with a gap between adjacent windings in the range of 1 millimeter to 10 millimeters.

13. The bladder sleeve of claim 10, wherein the carbon nanotube windings comprise multi-walled carbon nanotubes.

14. The bladder sleeve of claim 10, wherein the inner elastomer layer and the outer elastomer layer comprise silicone, ethylene propylene diene monomer, or a fluoroelastomer.

15. The bladder sleeve of claim 10, wherein the carbon nanotube windings comprise 2.5% to 30% of the bladder by weight.

16. The bladder sleeve of claim 10, further comprising:
insulated wire leads attached to each electrode, the insulated wire leads configured to be connected to a resistivity sensor.

17. A method for detecting damage to a bladder disposed in an oil reservoir of a power transformer, the method comprising:
measuring a resistance of carbon nanotube windings disposed between an inner elastomer layer of a bladder sleeve disposed around the bladder and an outer elastomer layer of the bladder sleeve;

detecting damage to the bladder by determining that the measured resistance exceeds a threshold resistance;

in response to determining that the measured resistance exceeds the threshold resistance, generating an alert indicating that the bladder is damaged.

18. The method of claim 17, further comprising:
in response to determining that the measured resistance exceeds the threshold resistance, stopping operation of the power transformer.

19. The method of claim 17, further comprising:
transmitting the measured resistance to a remote computing system over a network connection to remotely monitor the bladder.

20. The method of claim 17, wherein the carbon nanotube windings comprise a single continuous rope of carbon nanotubes wound around the inner elastomer layer of the bladder sleeve with electrodes attached to opposite ends of the single continuous rope of carbon nanotubes; and wherein measuring the resistance of the carbon nanotube windings comprises measuring the resistance using a resistivity sensor electrically coupled to the electrodes.

\* \* \* \* \*